US011979962B2

(12) United States Patent
Paderno et al.

(10) Patent No.: US 11,979,962 B2
(45) Date of Patent: May 7, 2024

(54) METHOD FOR CONTROLLING AN INDUCTION HEATING SYSTEM

(71) Applicant: Whirlpool Corporation, Benton Harbor, MI (US)

(72) Inventors: Jurij Paderno, Novate Milanese (IT); Francesco Del Bello, Rome (IT); Davide Parachini, Cassano Magnago (IT); Gianpiero Santacatterina, Cittiglio (IT); Diego Neftali Gutierrez, Varese (IT); Brian P. Janke, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 1537 days.

(21) Appl. No.: 16/176,991

(22) Filed: Oct. 31, 2018

(65) Prior Publication Data

US 2019/0069352 A1 Feb. 28, 2019

Related U.S. Application Data

(63) Continuation of application No. 12/946,070, filed on Nov. 15, 2010, now Pat. No. 10,136,477.

(30) Foreign Application Priority Data

Nov. 18, 2009 (EP) .................................... 09176298

(51) Int. Cl.
*H05B 6/06* (2006.01)

(52) U.S. Cl.
CPC .................................... *H05B 6/062* (2013.01)

(58) Field of Classification Search
CPC .......... H05B 6/062; H05B 6/065; H05B 6/06; H05B 6/067; H05B 6/08; H05B 6/10
USPC ................................ 219/620–621, 625, 627
See application file for complete search history.

(56) References Cited

U.S. PATENT DOCUMENTS 3,781,506 A 12/1973 Ketchum
4,340,796 A 7/1982 Yamaguchi
4,377,733 A 3/1983 Yamaguchi
(Continued)

FOREIGN PATENT DOCUMENTS

EP 1420613 5/2004
EP 1420613 A2 * 5/2004 ............. H05B 6/062
(Continued)

*Primary Examiner* — Nathaniel E Wiehe
*Assistant Examiner* — Alba T Rosario-Aponte
(74) *Attorney, Agent, or Firm* — Diederiks & Whitelaw, PLC.

(57) ABSTRACT

A method for controlling an induction heating system, particularly an induction heating system of a cooktop on which a cooking utensil with a certain contents is placed for heating/cooking purposes, comprises the steps of carrying out a predetermined number "n" of electrical measurements of a first electrical parameter of the heating system on the basis of a predetermined electrical value of a second electrical parameter, "n" being ≥2, repeating the above set of measurements at a predetermined time after the first measurements, and estimating at least one thermal parameter of the heating system, particularly of the contents of the cooking utensil, on the basis of the above set of measurements.

12 Claims, 8 Drawing Sheets

(56) References Cited

U.S. PATENT DOCUMENTS

| | | | | |
|---|---|---|---|---|
| 4,493,980 | A * | 1/1985 | Payne .................. | H05B 1/0266<br>219/448.12 |
| 4,617,441 | A | 10/1986 | Koide | |
| 6,140,617 | A | 10/2000 | Berken | |
| 6,320,169 | B1 | 11/2001 | Clothier | |
| 7,446,287 | B2 | 11/2008 | Tominaga | |
| 7,692,121 | B2 * | 4/2010 | Pinilla .................... | H05B 6/062<br>219/494 |
| 8,283,605 | B2 | 10/2012 | Arione et al. | |
| 2004/0149736 | A1 | 8/2004 | Clothier | |
| 2008/0121633 | A1 | 5/2008 | Pinilla | |
| 2010/0176120 | A1 | 7/2010 | Watanabe et al. | |

FOREIGN PATENT DOCUMENTS

| | | | | |
|---|---|---|---|---|
| EP | 1732357 | | 12/2006 | |
| EP | 1732357 | A2 * | 12/2006 | ............. H05B 6/062 |
| EP | 2194756 | | 6/2010 | |

* cited by examiner

METHOD FOR CONTROLLING AN INDUCTION HEATING SYSTEM

CROSS-REFERENCE TO RELATED APPLICATION

This application is a continuation of U.S. application Ser. No. 12/946,070, filed on Nov. 15, 2010 and titled "Method for Controlling an Induction Heating System." The entire content of this application is incorporated herein by reference.

BACKGROUND OF THE INVENTION

Field of the Invention

The present invention relates to a method for controlling an induction heating system, particularly an induction heating system of a cooktop on which a cooking utensil with a food contents is placed for heating/cooking purposes.

More specifically, the present invention relates to a method for estimating the temperature of a cooking utensil placed on the cooktop and the temperature of the food contained therein, as well as the food mass.

Description of the Related Art

With the term "heating system" we mean not only the induction heating system with induction coil, the driving circuit thereof and a controller including the driving circuit and the glass ceramic plate or the like on which the cooking utensil is placed, but also the cooking utensil itself, the food contents thereof and any element or component of the system. As a matter of fact, in induction heating systems it is almost impossible to make a distinction between the heating element on one side, and the cooking utensil on the other side, since the cooking utensil itself is an active part of the heating process.

The increasing needs of cooktops performances in food preparation are reflected in the way technology is changing in order to meet customer's requirements. Technical solutions related to the evaluation of the cooking utensil or "pot" temperature derivative are known from EP-A-1732357 and EP-A-1420613, but none of them discloses a quantitative estimation of the pot temperature.

Technical solutions related to the evaluation of the cooking utensil or "pot" temperature are known from European Patent Application No. 08170518, now EP Patent Publication 2194756 which has a common assignee with the present application and is incorporated herein by reference, but these solutions need a temperature measurement.

Other technical solutions related to the evaluation of the cooking utensil or "pot" temperature are known from the EP 2194756 of the same applicant, which shows how the method tunes the model during the entire process, on the basis of data collected during the cooking phase. Moreover, the algorithms used for the approach proposed by EP 2194756 need a large computational effort due the fact that they continuously compensate throughout the entire cooking process (i.e., closed loop system). As a result of this, there is no compensation on the initial uncertainties of the system temperatures (e.g., pot, food, water, glass, etc. temperatures).

SUMMARY OF THE INVENTION

An object of the present invention is to define a method as defined at the beginning of the description which does not present the above problems and is simple and economical to be implemented.

In the method according to the present invention, the tuning of the heating system is concentrated only in the initial phase, when the supplied power is used to heat the cooking utensil or pot, and while the pot contents is basically at constant temperature.

The method according to the invention can adopt an algorithm that uses less computational effort due to the fact that, once the initial parameters are estimated, the system can work in an open loop. The method according to the invention is able to calculate one set of parameters that can be used throughout the whole cooking process to estimate thermal variables (i.e., once the parameters are identified at the beginning, they are always valid). These parameters are able to be estimated as a result of a thermal model. Once these parameters are fixed, this method can work in an open loop, something which the known model, for instance, the one according to EP 2194756, cannot do.

Knowing the thermal properties of an induction cooktop as well as the thermal properties of the components interacting with the cooktop (temperatures of pot, pan, food and water contained in the pot, etc.) can provide valuable information regarding how food is cooking, how water is heating up, as well as how an appliance is operating. The challenge faced is how to estimate these thermal values without a direct temperature measurement. This invention is mainly focused on a method of obtaining reliable quantitative thermal estimations of not only the cooktop but also components interacting with the cooktop.

More specifically, the present invention relates to a link between electromagnetic variables, which can be easily measured without any increase of overall cost of the heating system, i.e. without introducing sensors and similar components, and the aforementioned thermal variables (which are therefore estimated on the basis of electrical or electromagnetic measurements). This link reduces the need for thermal measurements while maintaining reliable quantitative knowledge of these values. Prior art methods could provide only qualitative knowledge of these variables. For example, using the method according to the present invention, the temperature of food and/or water can be estimated as a result of electromagnetic measurement(s) within the cooktop. In addition, the knowledge of this electromagnetic-thermal link can be used to control thermal values via electromagnetic variables.

As consequence, the method according to the invention improves the ability to individually or separately monitor and/or control the thermal states of the following two items:

1) The system (coil, glass, etc.)
2) The parts interacting with the system (pot, pan, food, water, etc)

In an induction cooktop system, the switching frequency of the static switch and the power applied to the system are functions of one another. Or alternatively stated, the power supplied to the coil is directly related to the frequency of the static switch and vice-versa. Due to the fact that this relationship changes with temperature of the cooking vessel, three main techniques have been identified by the applicant to determine qualitatively the thermal states of a mass being heated as well as the pot (where the pot is defined as the general word describing a cooking utensil in which contents is heated, i.e. pot, pan, griddle, etc.). These qualitative methods are the starting point for the quantitative method that is the subject of the present invention.

According to a first technique, the static switch frequency is held constant and the measurable electrical variable(s) (power, current, power factor, etc.) is observed. The derivatives of the electrical variable(s) will maintain a fairly constant non-zero value during the heating process. For example, the derivative of the coil power (active power measured at the coil) will change according to the thermal power exchange between the elements composing the system (coil, pot, pot content, glass, ambient, etc.). By monitoring the coil power derivative (or alternatively, the derivative of any electrical variable(s) that interact with the pot), it is possible to obtain qualitative information regarding the state of the thermal mass. However, this information is qualitative because it is not possible to infer the temperature of an element within the system (or any other thermal value). For example, the temperature of the pot and its contents cannot be known by simply using this method alone. If we consider a set of electrical measurement(s) denoted Y (for instance the power supplied to the induction coil), and a set of variables defining the thermal state of the pot denoted $X_P$ (for instance its temperature), the following relationship links said measurements and said variables:

$$\frac{dY}{dt} = \frac{\partial Y}{\partial X_P}\frac{dX_P}{dt} \qquad (a)$$

No information is available regarding $$\frac{\partial Y}{\partial X_P},$$

where Y may be a function of many variables (e.g., switching frequency, displacement of the pot on the coil, thermal state $X_P$ of the pot, etc.). For this reason, it is not possible to simply integrate (a) in order to obtain an estimation of the pot thermal state $X_P$. However, (a) can be used, for example, to understand if the system (the pot in this example) achieves a thermal equilibrium:

$$\frac{dX_P}{dt} \approx 0 \Rightarrow \frac{dY}{dt} \approx 0$$

Often times, it is possible to invert the following relationship.

$$\left(\frac{dY}{dt} \approx 0 \Rightarrow \frac{dX_P}{dt} \approx 0\right).$$

However, if $$\left|\frac{\partial Y}{\partial X_P}\right| << 1,$$

then the inversion is not possible.

From here on, $$s = \left|\frac{\partial Y}{\partial X_P}\right| \qquad (a2)$$

will be referred to as the sensitivity function. To reduce the chances of this negative occurrence when $$\left|\frac{\partial Y}{\partial X_P}\right| << 1,$$

a special technique is used which maximizes the sensitivity function s. Another objective of the present technique is to quantify $$\frac{\partial Y}{\partial X_P}$$

in order to obtain an estimation of $$\frac{dX_P}{dt}.$$

This first technique is improved by utilizing a method for choosing the switching frequency such that the maximum value of the sensitivity function is achieved.

According to a second technique (which is very close to the first technique, and where the previous variable electrical parameters are now kept constant and the previously electrical constant parameter is now variable), some measurable electrical variable(s) (power, current, power factor, etc.) is held constant and the switching frequency is observed. The derivative of the frequency will maintain a fairly constant non-zero value during the heating process. In this case, the frequency derivative will change according to the thermal power exchange between the elements composing the system (coil, pot, pot content, etc). By monitoring this frequency derivative, information regarding the state of the thermal mass is obtained. As stated before for the first technique, this information is only qualitative; it is not possible to infer, for example, the temperature of any element composing the system (for instance, the pot temperature and/or its contents). It is clear that all the comments that were proposed to describe the first technique and its limits are true also for this second technique if “electrical variable(s)” and “coil power” are substituted for “switching frequency”. The sensitivity in this case is the derivative of the switching frequency with respect to the thermal state of the pot; in this case the sensitivity is a function of many variables, (e.g., any electrical variable that is related to the pot such as coil power, the pot and its displacement on the coil, the thermal state $X_P$ of the pot, etc.).

A third technique uses either a frequency-switching time series (i.e., a set of applied frequencies that are a function of time), a target-values time series (i.e., a set of target-values that are a function of time), or a combination of both. One possible example of this third technique could be a combination of both first and second techniques by holding frequency constant sometimes and holding target-values constant or varying at other times. In this scenario, either derivative could be an indication of a thermal state reaching a certain level. By monitoring these derivatives, qualitative information regarding the state of the thermal mass is obtained.

In other words, the above three techniques are able to determine temperature/thermal characteristics qualitatively (i.e., recognition can be made regarding a temperature characteristic such as water boiling or controlling the temperature at an unknown value). However, these techniques fail to offer a quantitative estimation of thermal values. For this reason, the present invention proposes additional methods.

The proposed method according to the invention improves any of the three described techniques in different ways:

- The method provides a way to estimate the thermal state $X_P$ (i.e., the pot temperature) for monitoring and/or controlling said state (e.g., empty pot detection, boil dry detection, boil detection, . . . )
- The method is able to compensate the action of the control: in case of the above second technique, for example, the closed loop control system changes the switching frequency according to the power/current/other parameters measurement(s); hence every disturbance that affects the controlled variable is reflected on the control variable (in this case frequency) thus affecting the robustness of the system. The method of the invention is able to compensate these variations, providing an estimation of the thermal state that doesn't depend on these noises.
- The method is able to compensate set-point variation: if the user changes the set-point (e.g., the power in case of the above second technique), the method of the invention is able to make up the new request.
- For the above first technique, the method of the invention provides a way to select the control parameter (the switching frequency). For the second technique, it provides a way to select the electrical variable(s) which are used as the target in the control (e.g., the power at the coil, the current, the power factor, etc.). For the third technique (which is a function of the first two techniques), it provides the advantages of both first and second techniques. In using the method according to the invention, the traditional approach of understanding $$\frac{dX_P}{dt}$$

is not only improved upon, but also it can achieve the best estimation of $X_P$ by obtaining the value at which the sensitivity is at its maximum. Summing up, the method according to the invention improves upon the $$\frac{dX_P}{dt}$$

estimation as well as providing the best estimation of $X_P$.
- From the knowledge of $X_p$, the method can be used to estimate other thermal values (e.g., pot content temperature, coil temperature, glass temperature, etc.)
- The method provides a way to detect the instant when the boiling status is achieved (in case the pot content is a liquid (e.g. water)).
- The method provides a way to detect the instant when the content of the pot dries and, as consequence, to switch off the supplied power.
- The method provides a way to detect an empty pot and, as consequence, to switch off the supplied power.
- The method provides a way to maintain a particular thermal status (i.e., pot temperature).
- The method provides a way to estimate the temperature of the liquid in the pot, compensating its quantity.
- The method provides a way to detect the instant of boiling, compensating the liquid quantity.

Even if the control method according to the present invention is primarily for applications on cooktops or the like, it can be used also in induction ovens as well.

BRIEF DESCRIPTION OF THE DRAWINGS

Further advantages and features of the method according to the invention will be clear from the following detailed description, with reference to the attached drawings in which.

DETAILED DESCRIPTION OF THE PREFERRED EMBODIMENTS

Figure 1:
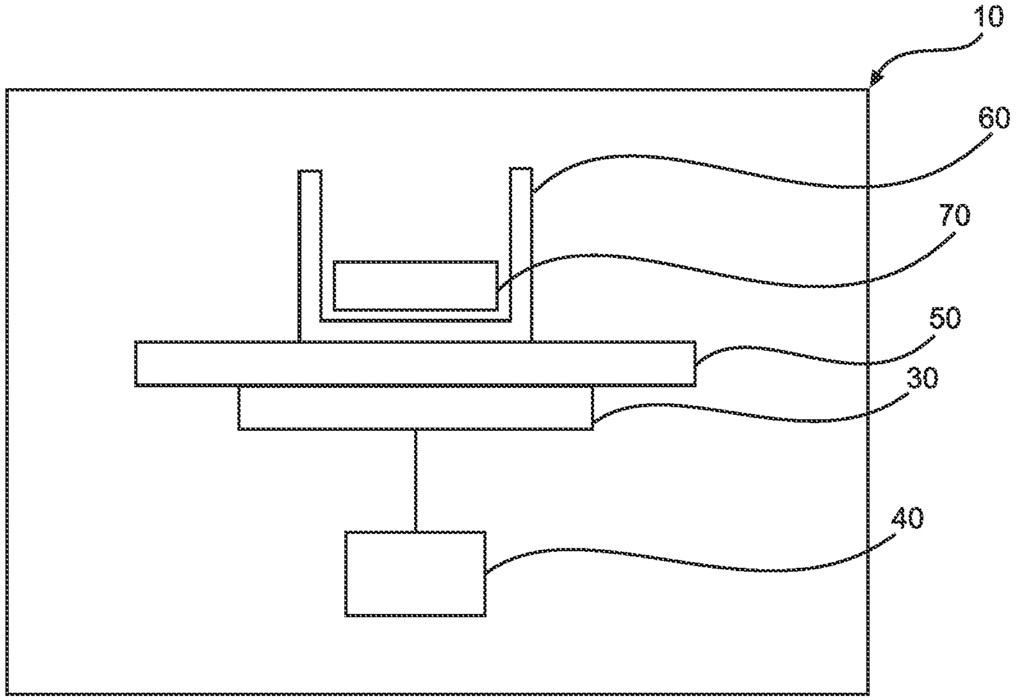
FIG. 1 is a schematic diagram of an induction heating system of a cooktop, with an induction coil, a controller having driving circuit thereof, a glass ceramic plate or the like on which a cooking utensil is placed, the cooking utensil itself, and food contents thereof.

In order to achieve the previously stated goal of qualitative thermal estimation, three main tools are needed:

1. A thermal model
2. A set of measurements (which will be referred to as a "sweep")
3. An electrical-thermal model The Thermal Model FIG. 1 is a schematic diagram of an induction heating system 10, with an induction coil 30, a controller having a driving circuit thereof 40, a cooktop 50 or the like having a surface on which a cooking utensil 60 is placed, cooking utensil 60 itself, and food contents 70 thereof. In the induction cooktop which includes the heating system that operates with and incorporates the controller configured to perform the various steps set forth below in FIG. 5, there are many different variable choices in which to represent a thermal model (e.g., mass, temperature, enthalpy, entropy, internal energy, etc.). Depending on the desired complexity, the thermal state can consist of one or many of these variables. These variables (which are linked to the pot and/or pot contents) can be used to directly relate electrical values and thermal values. For the sake of the following example, allow X to represent an array of variables associated with the cooktop. A thermal model is a set of equations depending on previously described thermal states and proper input variables.

The following represents a possible thermal model of the system.

$X_c$=Variable(s) related to the thermal properties of the pot contents;

$X_i$=Variable(s) related to the thermal properties of all elements in the model that are interacting in the system e.g. pot, coil, glass, etc. (excluding the contents of the pot);

p=some number of thermal parameters;

u=input variable(s) to the model (i.e., power provided at the coil and/or current at the coil and/or Main voltage, etc.).

$$\text{Thermal Model} \begin{cases} \frac{dX_c}{dt} = f_c(X_i, X_c, p) \\ \frac{dX_i}{dt} = f(X_i, X_c, u, p) \end{cases} \quad \text{(I)}$$

In this model, it can be observed that the dynamics of the pot contents ($X_c$) are a function of the other thermal states ($X_i$), the pot contents state ($X_c$), and some number of thermal parameters (p). In addition, the dynamics of the individual elements in the system ($X_i$=everything excluding the pot contents) are functions of the rest of the elements in the system ($X_c$ and $X_i$), as well as the inputs of the system (i.e. power at the coil), and some number of thermal parameters.

For example: in the case where the pot content is water, the state of the pot content ($X_c$) could be described by 2 parameters (i.e. water temperature and water mass).

The parameter by which the model depends, (parameters p) are assumed to be known values.

The Sweep(s)

A sweep is defined as a series of electrical measurements. A sweep must be fast enough so that all electrical measurements occur with nearly zero change in system's temperature (i.e., a sweep must be much faster than the fastest thermal dynamics of the system). A sweep consists of some integer number n of electrical measurements (Y) (assuming n=number of measurements), each of them made at some particular electrical value (z). There are many choices as to which electrical value should be used (e.g., switching frequency, power, current, etc. or any combination). There must be n of these electrical values. In this definition, n≥2. To summarize, a sweep provides a series of electrical measurements (at least two) in which it can be assumed that the thermal variables of the system are constant.

A sweep is at least two sets of n numbers:

(II)

| z | Y |
|---|---|
| $z_1$ | $Y_1$ |
| $z_2$ | $Y_2$ |
| . | . |
| . | . |
| . | . |
| $z_n$ | $Y_n$ |

n ≥ 2

The sweep data (II) can be utilized in many ways in addition to using the actual measured values. Some examples are interpolation, or fitting a model based on the sweep information. As a result, a sweep function can be defined SW(t; z). The notation S(t; z) indicates that a sweep must be performed at time t. Furthermore, z indicates the values of the independent electrical variable(s) and Y represents the values of the consequent electrical measurement(s) (as stated before, a sweep can store more that one electrical variable—for instance power and main voltage). For example, z (the independent variable) could be a set of n different switching frequencies and Y (the dependent variable(s)) could be the set(s) of the measured powers and/or currents, and/or other electrical parameters at the coil at those frequencies defined in z. However, the currents, powers, or the other electrical parameters could be used as the z value and the measured switching frequency as the Y value (e.g., in the case of a closed loop system).

It is noted here that number of measurements made at each sweep does not have to be a constant number. In addition, the sweeps do not have to contain the same z values (e.g., the first sweep could contain two measurements taken at $z_1$ and $z_2$, and the second sweep could contain three measurements taken at $z_4$, $z_5$, $z_6$, where the z values may or may not be equal to each other).

Figure 2:
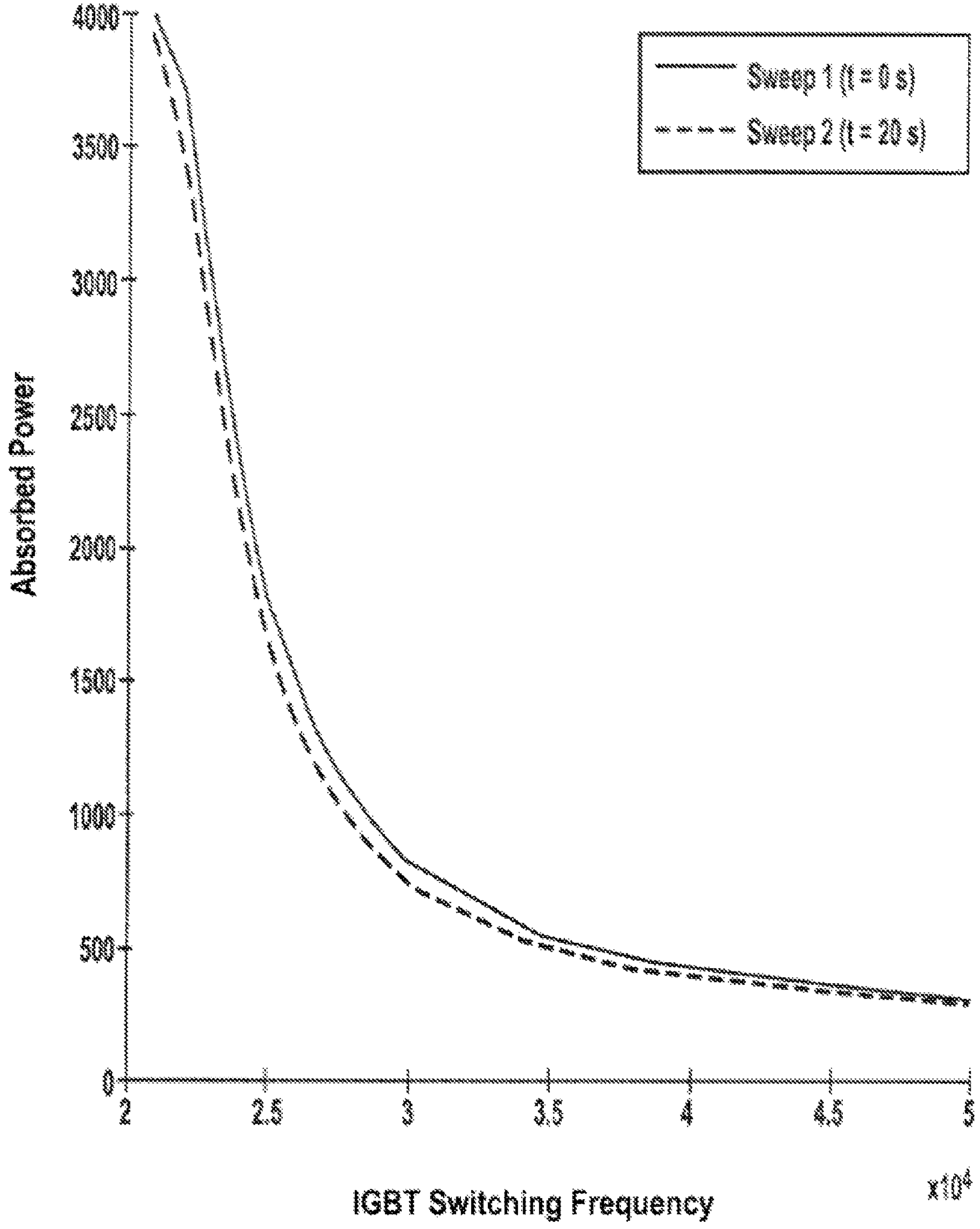
FIG. 2 is a diagram power vs. frequency showing the absorbed power vs. IGBT switching frequency at the beginning (solid line) and at the end (dotted line) of a pot heating phase.

With reference to FIG. 2, which shows an example of two sweeps, power is the electrical measurement evaluated. For this reason, the first technique defined above is considered, however, it is equally plausible to measure frequency and use the second technique, or some combination of variables and use of the third technique. By considering only the first technique, a power measurement comparison is made between sweeps (i.e., determine how the power measurements of sweep 1 compare to the power measurements of sweep 2).

The Electrical-Thermal (or Electromagnetic-Thermal) Model

Thus far, the following have been defined: a thermal model, the ideas of a sweep and sensitivity. The next step is to relate electrical variables to the thermal variables of the pot $X_p$ (defined as a subset of component(s) of $X_i$, each related only to the pot). Mathematically speaking, the goal is to identify an equation such that $X_p$ can be represented as a function of electrical measurement(s) and some number of known parameters.

Y=at least one of the measured electromagnetic variables already introduced in the sweep definition. There could actually be a model where the estimated electrical magnetic variable is w≠Y, but a known relationship w=F(Y) links the w value to the Y value. It is obvious that by a simple re-definition of w by the equation w=F(Y), it is possible to pass from the general case to the specific case described here. For this reason, it will now be assumed that the electromagnetic-thermal model provides an estimation of the same Y available by the sweeps. The example will show the more general case, where w≠Y k=Some set of N parameters $X_p$=Thermal variables of the pot such that $X_p \in X_i$ $$\text{Electrical-Thermal model } Y=g(X_p,k) \quad \text{(III)}$$

The above equations in the Electrical-Thermal model set up a relationship between the electromagnetic(s) and the thermodynamics of the system. The goal is to find the values comprising k so that these equations can be used to solve for $X_p$ by simply making electrical measurement(s). The next step is to understand and utilize the thermal physics of the system in order to obtain these k values.

The Method

In general, $X_p$ can be estimated (and as consequence, the state of the pot contents $X_c$ can be also estimated) in two ways, each of them suffering limitations:

1. By integrating the thermal model described above. The problem is that the food state ($X_c$, the state of the pot contents) is unknown at the beginning. That is, the initial condition of the equations (I) are not completely known. In general this has a big impact on the estimation 'goodness'. For example: if we assume that there is water inside the pot, even though the initial temperature could be known, the unknown water mass introduces a large noise and consequently a large uncertainty in the estimation. As a result, this approach becomes impractical.

2. By inverting the electromagnetic-thermal model. In this case, the problem is that the k parameters, which are needed to solve equation(s) (III), are unknown.

The method according to the invention combines both the methods 1 and 2, thus overcoming the problems and limits of each of them individually.

The method uses (I) and (II) in a particular way, in order to estimate the k parameters.

Two assumptions are introduced which can be considered very general and reasonable in most cases:

Assumption 1: The thermal dynamics of the pot are faster than the thermal dynamics of the pot contents (For example: Phase 1 in FIG. 3).

Assumption 2: The initial thermal values of the cooktop and the elements interacting with the cooktop are known.

Figure 3:
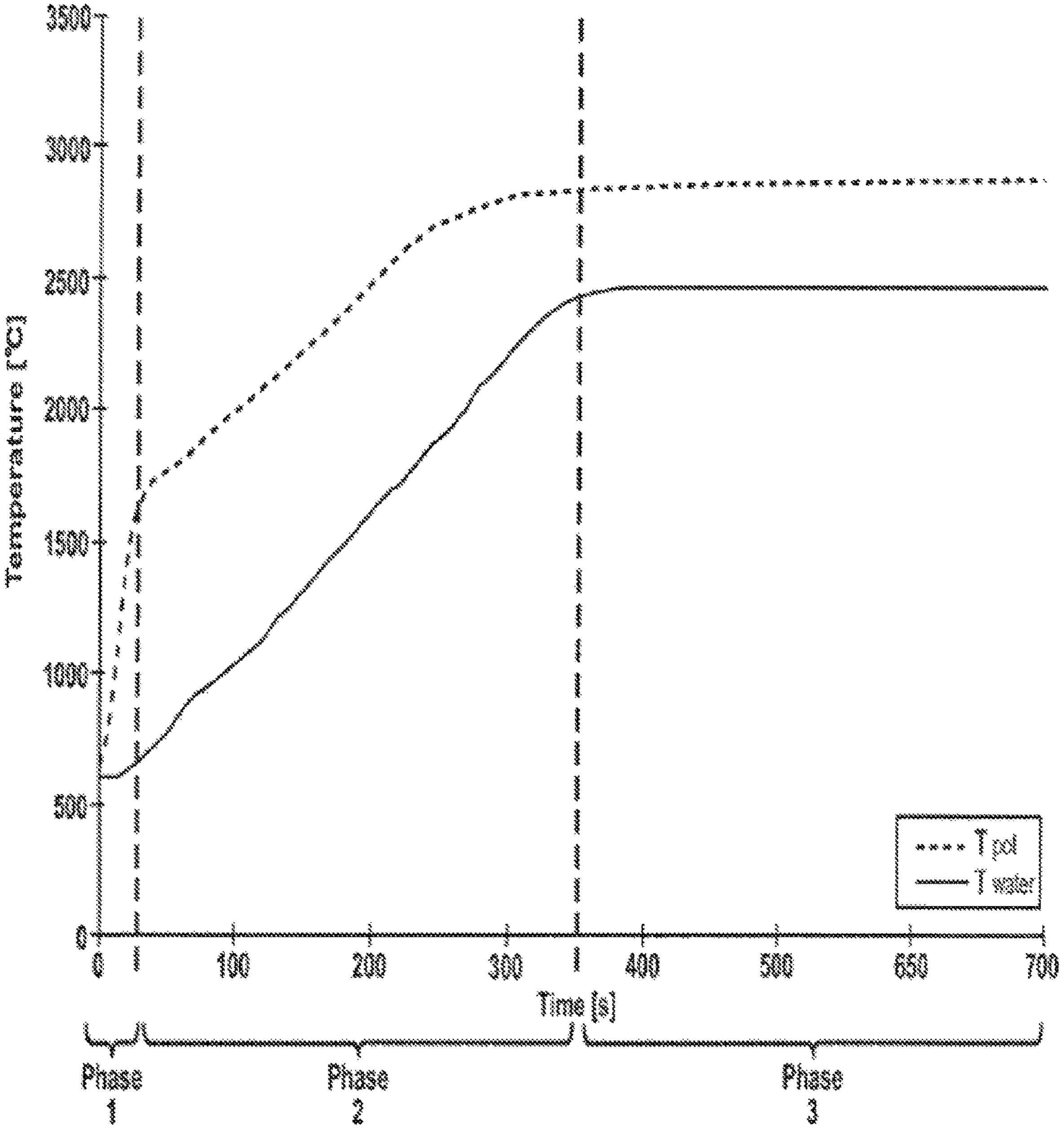
FIG. 3 is a diagram showing the temperature of water (solid line) and pot containing it (dotted line) vs. time throughout the induction heating process.

To understand the meaning of Assumption 1, we have to consider, for example, the case in which the pot content is water. FIG. 3 shows the temperature of water being heated on a cooktop ($T_{water}$—solid line) and the temperature of the pot on the same time scale ($T_{pot}$—dotted line). By breaking down FIG. 3 into three phases, it can be seen that Phase 1 consists of very fast dynamics ($T_{pot}$ increases very quickly in the first phase compared to $T_{water}$): this is the heating phase of the pot. In Phase 2, the total thermal mass (pot and water) heat at very similar rates (there is a close correlation between the slopes of $T_{water}$ and $T_{pot}$ in Phase 2). The same can be said for Phase 3 which corresponds to the time the water is boiling. This behaviour shows that assumption 1 is reasonable in this case.

If we consider the previously described thermal model, it can be seen that in Phase 1 the equation describing the thermal variables of the pot contents ($X_c$) can be ignored as a result of Assumption 1. This means the thermal model can be simplified (shown below), by disregarding the equations referring to the pot content (only during the first phase). The simplified model can describe the heating process of some element interacting with the cooktop during Phase 1.

$$\frac{dX_i}{dt} = f(X_i, x_C \approx const, u, p) \tag{Ia}$$

In most of the cases, this simplification is valid, (i.e., the dependence on the pot contents can be disregarded because $X_c \approx$const). In Phase 1, the model can be assumed to be the following:

$$\frac{dX_i}{dt} = f(X_i, u, p)$$

As a result of Assumption 2, this model can be integrated (numerically or analytically depending on the case). The result of this integration is the following:

$$X_i(t)=F(X_i(t_0),u(t),p)$$

Because $X_p \in X_i$, the following can be stated:

$$X_p(t)=F(X_n(t_0),u(t),p) \tag{Ib}$$

Now, the values of $X_i$ (and $X_p$) can be estimated at each time during the first phase.

Figure 4:
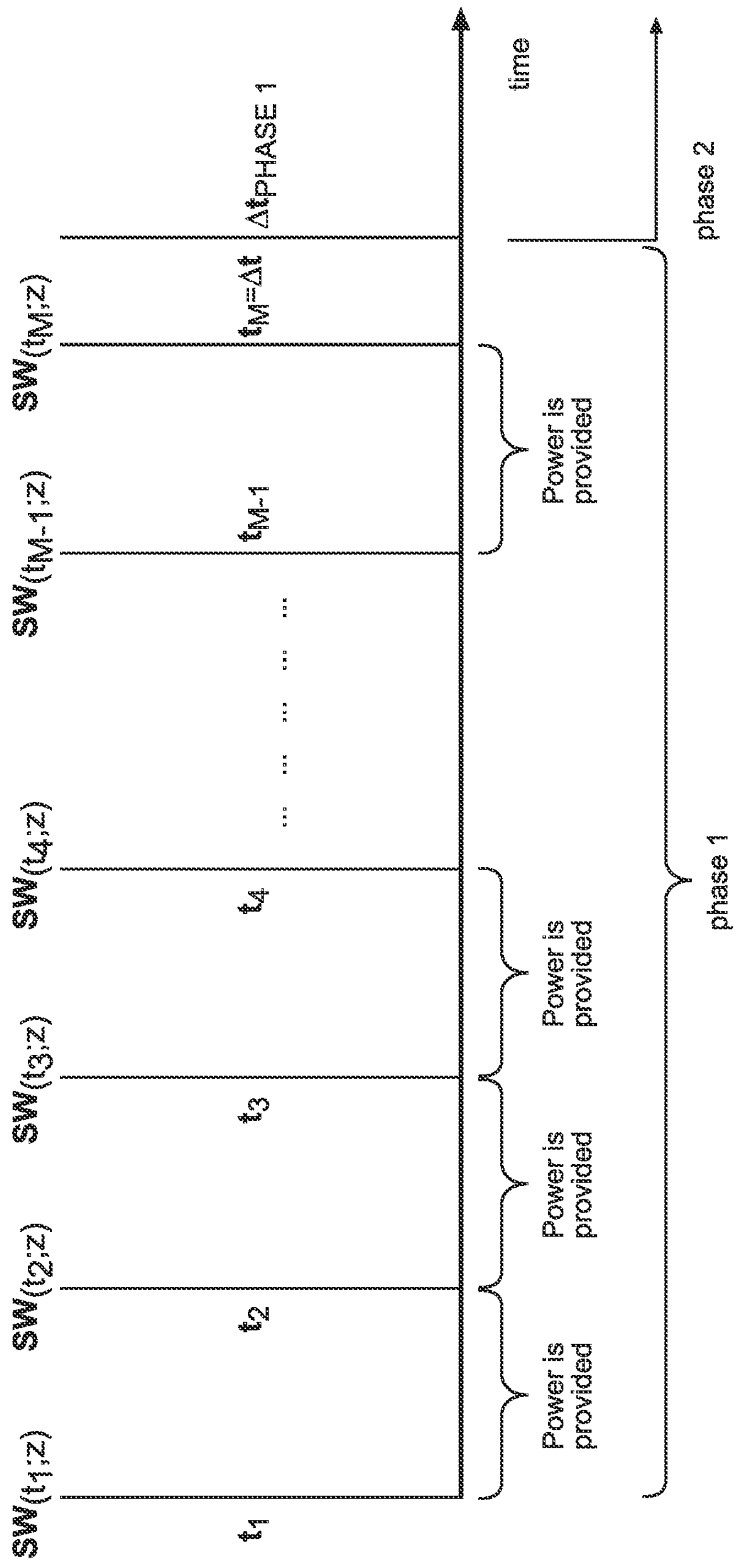
FIG. 4 shows the timing of the sequence according to the invention.

We now define $\Delta t_{PHASE1}$ to represent the time duration of Phase 1. It can be assumed that this time interval is a known value based on prior information. With this information, a number of sweeps are performed (see FIG. 4):

(IV)

| time | Sweep |
|---|---|
| $t_1$ | SW($t_1$; z) |
| $t_2$ | SW($t_2$; z) |
| . | . |
| . | . |
| . | . |
| $t_M$ | SW($t_M$; z) |

M ≥ 2

Where $$t_1<t_2< \ldots <t_M<\Delta t_{PHASE1}$$

$$t_1<t_2< \ldots <t_M<\Delta t_{PHASE1}$$

The period of time ($\Delta t=t_M-t_1$) is the time between the first and last sweep. This time interval must be correctly chosen so to ensure that the observed thermal effects are of the heating pot and not the pot contents (i.e., the final sweep must be completed before Phase 2 begins because when Phase 2 begins, the thermal characteristics of the pot contents are no longer negligible). It can be noted that the number of measurements does not have to be constant between sweeps (e.g., sweep 1 can have a different number of measurements than sweep 2, sweep 3, etc.).

Figure 5:
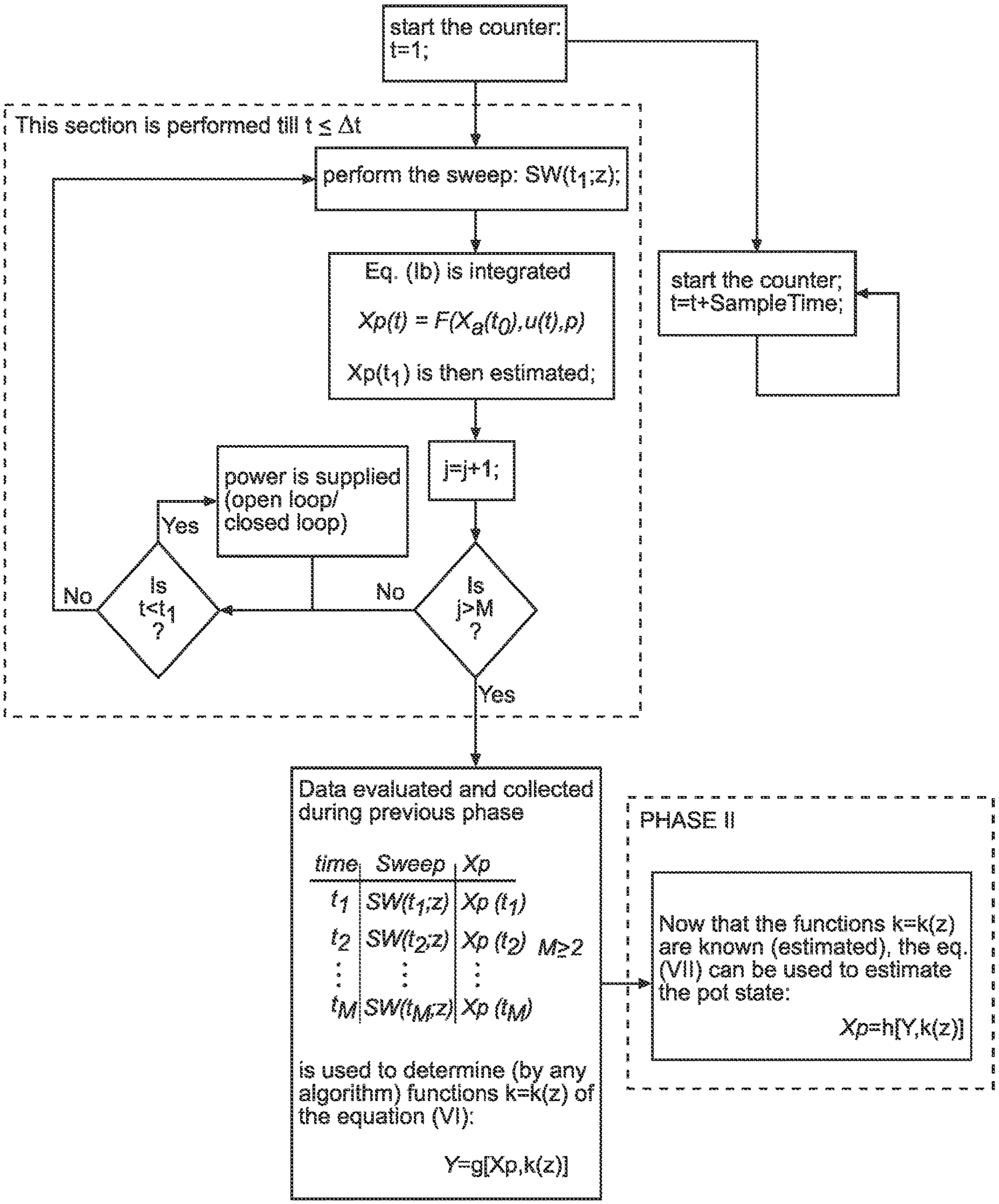
FIG. 5 is a flow chart showing how the method according to the invention works.

Between each pair of contiguous sweeps, any kind of control strategy can be applied. In other words, between two contiguous sweeps $SW(t_j;n) \rightarrow SW(t_{j+1};n)$ during the time interval $t_{j+1}-t_j$, it can be used any control strategy, for instance:

open loop (that is constant switching frequency);

closed loop (closed on the power and/or current and/or power factor and/or other electrical parameters, in addition, the target could be any function of the time);

The relationship stated in (IV) can be integrated as described in (Ib) (see FIG. 5). This result provides the estimation of the thermal pot states $X_p$ at each instance in which a sweep has been performed:

(V)

| time | Sweep | $X_P$ |
|---|---|---|
| $t_1$ | SW($t_1$; z) | $X_p$ ($t_1$) |
| $t_2$ | SW($t_2$; z) | $X_p$ ($t_2$) |
| . | . | . |
| . | . | . |
| . | . | . |
| $t_M$ | SW($t_M$; z) | $X_p$ ($t_M$) |

M ≥ 2

Where, again $$t_1<t_2< \ldots <t_M<\Delta t_{PHASE1}$$

At this point, the thermal model (tool 1) and the sweep (tool 2) are utilized in Phase 1 where the noise caused by the pot content is limited (Assumption 1). This allows collecting a set of measurements as reported in (V). This set of measurements can be used to identify the parameter k of the electromagnetic-thermal model (tool 3), by using any algorithm known in literature (e.g., least square). In fact, the Y is available by the sweeps and the pot thermal state $X_p$ is available by the estimation. The final result is the identification of parameters k in equation (III) as function of z (the independent variable used in the sweeps):

$$Y=g[X_p,k(z)] \tag{VI}$$

This model does not depend on the phase, because it represents a relationship between only the pot thermal variables and electromagnetic variables. Assuming that it is possible to invert with some mathematical and/or numerical tool, the result is:

$$X_p=h[Y,k(z)] \tag{VII}$$

Equation (VII) represents the fact that the method according to the invention provides a way to estimate the thermal state $X_P$ (e.g., the pot temperature).

Once the eq. (VII) is solved, it can be used to estimate the thermal state of the pot content, by combining it with the thermal model (Ia) used in the Phase 2:

$$\frac{dX_i}{dt} = f(X_i, X_p, X_c, u, p) \quad i \neq p \quad X_p = h[Y, k(z)] \tag{Ic}$$

In other words, it is possible to get rid of the part of the thermal model equations concerning the variable(s) $X_P$. Then, the model can be rewritten as:

$$\frac{dX_i}{dt} = f(X_i, h[Y, k(z)], X_c, u, p,) \quad i \neq p \tag{Id}$$

The number of differential equation of the (Id) model is reduced with respect on the original model (Ia). Moreover, also the number of parameters by which the (Id) depends is lower than in case (Ia). It means that the dependence on possible uncertainties is reduced.

Now, we can integrate (numerically or analytically, depending on the case) the model (Id) during the Phase 2, obtaining the estimation of the thermal state $X_i$ i≠p and $X_c$.

The method according to the invention provides also a procedure to set the control parameter(s) (i.e., switching frequency and/or power and/or current ad/or power factor and/or other electrical parameters) as function of the time in order to have the best estimation of $X_P$ and/or its time derivative. In fact, by equation (VI) the sensitivity (a2) can be evaluated as a function of z. Without this procedure, the sensitivity could not be identified.

$$s(z) = \left|\frac{\partial Y}{\partial X_P}\right| = \left|\frac{\partial g[X_P, k(z)]}{\partial X_P}\right| \tag{VIa}$$

Therefore, at a certain estimated $X_P$ value, z can be set in such a way to maximize the function s(z):

$$z_{control}: \max_z s(z)$$

It is important to notice that the value $z_{control}$ can be estimated by the sweeps. In fact, an estimation of the derivative showed in eq. (VIa) can be evaluated in Phase 1 using sweeps along with many algorithms known in literature (e.g. finite differences). For example:

$$s(z) = \left|\frac{\partial Y}{\partial X_P}\right| = \left|\frac{\partial g[X_P, k(z)]}{\partial X_P}\right| \propto |Y_M - Y_1|$$

In this way, by using only the sweeps and Assumption 1, it is possible to estimate the sensitivity and then select the best set of control parameter(s).

In other words, even when the goal is not to estimate the thermal state of the pot ($X_p$), the method according to the invention can still be used to select the best control parameters as a result of the sweep tool. By using the previously described sweep tool, the three techniques mentioned above can be improved upon.

With reference to a specific embodiment of the present invention, we start from the following assumption:

- Assume the pot content is water
- During the Phase 1, just 2 sweeps are performed (M=2)
- During the Phase 1, between the two sweeps the control maintains constant power (this is unnecessary: it is for the sake of simplicity)
- The first sweep is made at $t_1=0$;
- The second sweep is made at $t_2=\Delta t=t_2-t_1$ The Thermal Model Assuming the pot content is water, one of the many possible models could be the following:

$$\frac{dT_{water}}{dt} = -p_1 \cdot \Delta T \tag{1}$$

$$\frac{d\Delta T}{dt} = -p_2 \cdot \Delta T + p_3 \cdot P_{in}(t) \tag{2}$$

$$\Delta T = T_{pot} - T_{water}$$

In this particular model, the following definitions and assumptions are used:

$T_w$=temperature of the water $T_{pot}$=temperature of the heating container (pot, pan or the like)

$P_{in}$=power supplied to the pot $p_1$,$p_2$,$p_3$=positive constants

Assumption 1: The thermal dynamics of the pot are faster than the thermal dynamics of the pot contents during Phase 1→$p_1 \ll p_2$ Assumption 2

$$\Delta T_0 = \Delta T(t=0) = 0^\circ \text{ C.} \quad T_{pot0} = T_{pot}(t=0) = 25^\circ \text{ C.}:$$

the pot and the water are initially at room temperature

Above state-equation 2 is approximately one order of magnitude faster than state-equation 1 based on Assumption 1. This means that Phase 1 can be represented solely by state-equation 2 (this is determined because in FIG. 3 it was seen that in Phase 1 $\Delta T_{pot}$ is much larger than $\Delta T_w$). As a result, the main noise in the system is eliminated during Phase 1. Therefore, the simplified version of the model (which is effective during Phase 1) is as follows:

$$\frac{d\Delta T}{dt} = -p_2 \cdot \Delta T_{pot} + p_3 \cdot P_{in}(t)$$
$$\Delta T_0 = \Delta T(t=0) = 0^{\circ}\text{ C.}$$

With the goal to estimate the temperatures quantitatively from the measurements of the electromagnetic system, it becomes advantageous to utilize Phase 1. It is possible to integrate the simplified model analytically:

$$\Delta T(t)=\Delta T_0 \cdot e^{-p_2 \cdot t}+p_3\int_0^t d\tau \cdot e^{-p_2\cdot(t-\tau)}P_{in}(\tau) \quad \text{(VII)}$$

For sake of simplicity, it has been assumed that during Phase 1 the power is maintained constant at a particular level, (this level is denoted $\overline{P}_{in}$); then the estimated temperature of the pot becomes:

$$\Delta T(t) = \frac{p_3}{p_2}\overline{P}_{in} \cdot (1 - e^{-p_2 \cdot t})$$

And then:

$$T_{pot}(t) = T_{pot0} + \frac{p_3}{p_2}\overline{P}_{in} \cdot (1 - e^{-p_2 \cdot t})$$

This is valid only during the Phase 1. In other words, the last equation corresponds to eq. (Ib) in this particular case.

The Sweep(s)

In this particular embodiment, it is assumed that the system is in an open loop and z=switching frequency.

In addition, the measured variables are chosen to be power at the coil and the voltage at the main such that Y=(P,V) (however many other possible choices are valid). A set of n=10 measurements will be made during each sweep.

Then, for this embodiment, general eq. (II) becomes:

| | z = switch.freq. | P = Power | V = Voltage |
|---|---|---|---|
| SW(t; z) = | $z_1$ | $P_1$ | $V_1$ |
| | $z_2$ | $P_2$ | $V_2$ |
| | . | . | . |
| | . | . | . |
| | . | . | . |
| | $z_n$ | $P_n$ | $V_n$ |

n = 10 ≥ 2

In this case, the sweeps are built by interpolation of the n points; however, this is one of many possible options. Moreover, the same number of data points is used for the two sweeps (for sake of easy notation). It is important to notice that it is not necessary to use the same number of points for each sweep.

The eq. (IV) becomes:

| time | Sweep |
|---|---|
| 0 | SW(0; z) |
| Δt | SW(Δt; z) |

The Electrical-Thermal (or Electromagnetic-Thermal) Model

Consider the following variable definition:

$$P_{comp} := P\left(\frac{230}{V}\right)^2$$

This definition corresponds to the definition of w=$P_{comp}$=F(Y) variable, as function of the variable measured in the sweeps.

Now, consider the following electromagnetic-thermal model:

$$P_{comp} : \propto \left(\frac{|z|}{\cos\phi}\right)^{-1} \approx \frac{k_1}{T_{pot} + k_2}$$

These two relationships correspond to equation (III). The proposed electrical-thermal model is one of the many possible models that link thermal variables to electrical variables.

In particular, the link in this embodiment is between the physical relationship of the load impedance (which is calculated via electrical measurements) and the thermal characteristics.

The Method

By combining what has been previously stated results in the following:

| time | Power | Voltage | $w = P_{comp} = P\left(\frac{230}{V}\right)^2$ | $X_P = T_{pot}$ |
|---|---|---|---|---|
| 0 | P(0, z) | V(0, z) | $P_{comp}(0, z) = P(0, z)\left(\frac{230}{V(0, z)}\right)^2$ | $T_{pot}(0) = T_{pot0}$ |
| Δt | P(Δt, z) | V(Δt, z) | $P_{comp}(\Delta t, z) = P(\Delta t, z)\left(\frac{230}{V(\Delta t, z)}\right)^2$ | $T_{pot}(\Delta t) = T_{pot0} + \frac{p_3}{p_2}\overline{P}_{in} \cdot (1 - e^{-p_2 \cdot \Delta t})$ |

Now, the two columns can be used to identify the two parameters $k_1$, $k_2$; in this case it is very easy and can be evaluated analytically:

$$P_{comp}(0,z)=\frac{k_1}{T_{pot}(0)+k_2} \qquad P_{comp}(\Delta t,z)=\frac{k_1}{T_{pot}(\Delta t)+k_2} \Rightarrow$$

$$k_1=k_1(z)=P_{comp}(0,z)\cdot\left(T_{pot}(0)+\frac{P_{comp}(0,z)\cdot T_{pot}(0)-P_{comp}(\Delta t,z)\cdot T_{pot}(\Delta t)}{P_{comp}(\Delta t,z)-P_{comp}(0,z)}\right)$$

$$k_2=k_2(z)=\frac{P_{comp}(0,z)\cdot T_{pot}(0)-P_{comp}(\Delta t,z)\cdot T_{pot}(\Delta t)}{P_{comp}(\Delta t,z)-P_{comp}(0,z)}$$

Then, the problem is solved:

$$T_{pot}(t)=\frac{k_1(z)}{P_{comp}(t,z)}-k_2(z) \tag{VIII}$$

This solution is valid for any time t (inside or outside of Phase 1) and for any z (in this particular embodiment, this concept can be explained by the fact that the value of Tpot has no dependence on the z value; however, this non-dependence is a result of the method and is a valid point in any situation in which the method according to the invention is used).

In other words, the noise introduced by z is compensated on the Xp estimation by identifying the k parameters as proper functions of the z.

By combining eq. (VII) and (VIII) we can also provide an estimation of the water temperature during the entire process (Phase 1 and Phase 2):

$$T_{water}(t)=T_{pot}(t)-\Delta T(t)=\left(\frac{k_1(z)}{P_{comp}(t,z)}-k_2(z)\right)-\left(\Delta T_0\cdot e^{-p_2\cdot t}+p_3\int_0^t d\tau\cdot e^{-p_2\cdot(t-\tau)}P_{in}(\tau)\right)$$

We therefore estimate the water temperature without a precise knowledge of the $p_1$ parameter. It means that we compensated the uncertainties about a part of the thermal model. In this particular embodiment, the $p_1$ parameter depends on the mass water that is an unknown variable of the process.

At this point, we have to show in this simple embodiment how to select the control parameters to be set in order to have the best estimation performance. As explained before, once we have identified the k parameters, we can easily evaluate eq. (Via), which becomes:

$$s(t,z)=\left|\frac{\partial Y}{\partial X_P}\right|=\left|\frac{\partial P_{comp}[T_{pot}(t),z]}{\partial T_{pot}(t)}\right|=|k_1(z)|\left(\frac{1}{T_{pot}(t)+k_2(z)}\right)^2$$

So, at a certain estimated $X_P$, the z can be set in such a way to maximize the function s(t,z) with respect to z $$z_{control}:\max_z s(z)$$

But it is much easier to adopt the other method already described. We can estimate the sensitivity function in Phase 1 by a comparison between the two sweeps. In particular, using the simplified definition of sensitivity:

$$s(z)=|P_{comp}(0,z)-P_{comp}(\Delta t,z)|$$

Figure 6:
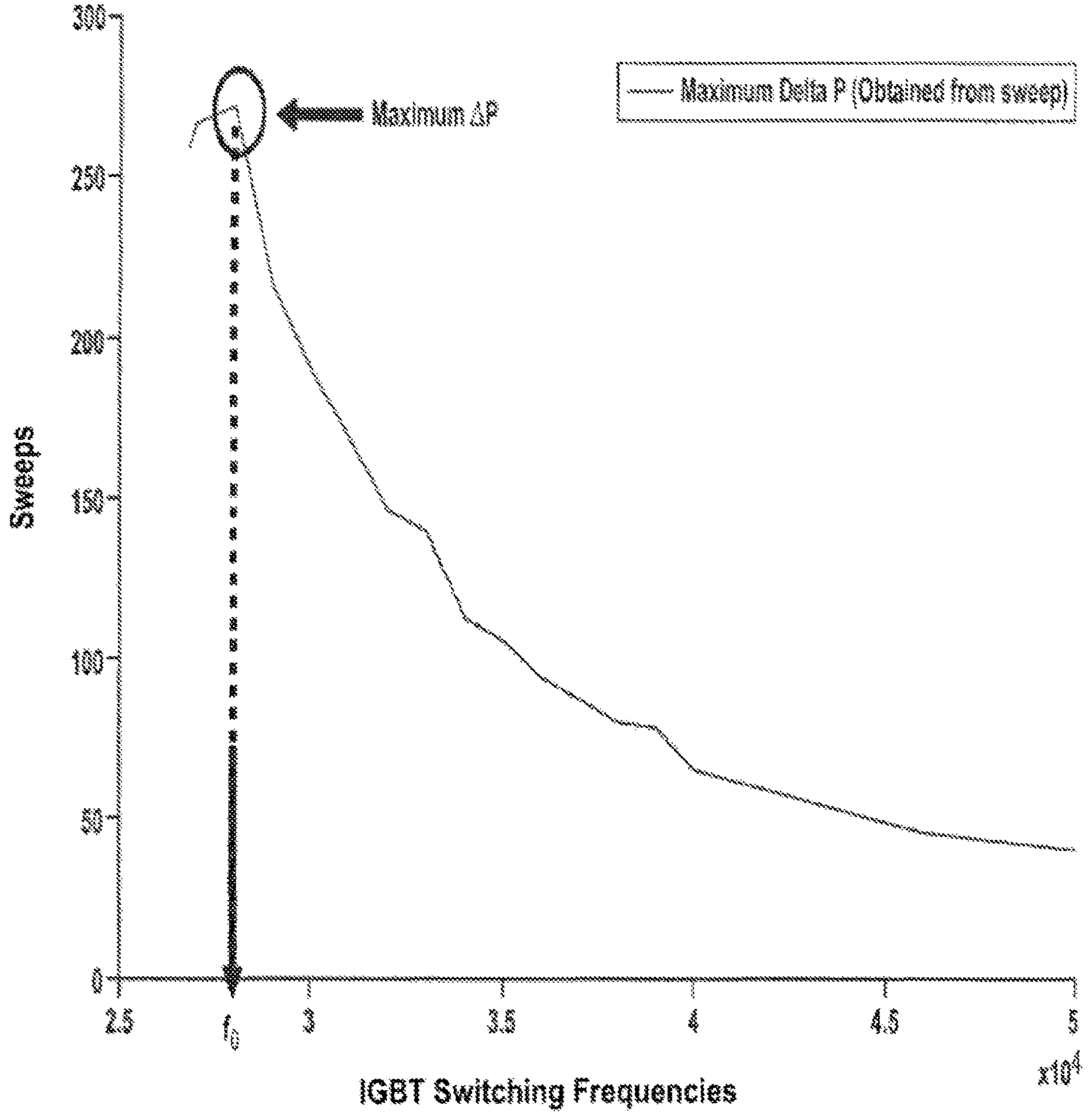
FIG. 6 is a diagram showing the power difference between "sweeps" (as defined in the following) vs. IGBT switching frequencies.

In this embodiment, the frequency at which this maximum $\Delta P_{comp}$ occurs will be called ($f_0$) (See FIG. 6). The value of ($f_0$) corresponds to the frequency at which the sensitivity is, the highest. Using values with high sensitivity result in reduced error in estimations.

EXAMPLE

According to the above described embodiment, we provide herewith an example based on actual experiment. Such experiment has been performed by using a commercial pot (Lagostina) which has been slightly modified. Before performing the test, a blind hole was made in the bottom of the pot and a thermocouple was introduced in such hole so to be completely dipped in the metal of the vessel. The pot content was water. The thermocouple was not in contact with the water. Then, to have a simplified calculus, we assume to work with the approach described in the first technique during Phase 2 (constant frequency).

The thermal model $$\frac{dT_{water}}{dt}=-p_1\cdot\Delta T$$
$$\frac{d\Delta T}{dt}=-p_2\cdot\Delta T+p_3\cdot P_{in}(t)$$
$$\Delta T=T_{pot}-T_{water}$$

is defined by the following parameters set:

$p_1$=unknown $p_2$=1e−2

$p_3$=1.033e−3

Then, we'll work in open loop, assuming than the variable z previously introduced is the switching frequency f, that is z=f (1)

The first sweep has been performed at t=0 [s] in open loop at 13 different switching frequency values, measuring 1. the supplied power (at the coil)
2. the voltage (at the converter)

then the compensated power $$P_{comp}=P\left(\frac{230}{V}\right)^2$$

is evaluated:

| frequency[kHz] | Power[W] | Voltage[V] | $P_{comp}$ [W] |
|---|---|---|---|
| 50 | 304 | 234 | 293.7 |
| 40 | 416 | 230 | 416.0 |
| 35 | 528 | 229 | 532.6 |
| 30 | 800 | 227 | 821.3 |
| 29 | 928 | 223 | 987.2 |
| 28 | 1056 | 225 | 1103.5 |
| 27 | 1232 | 220 | 1346.5 |
| 26 | 1504 | 223 | 1599.9 |
| 25 | 1792 | 216 | 2031.8 |
| 24 | 2352 | 218 | 2618.1 |
| 23 | 2991 | 225 | 3126.5 |

-continued

| frequency[kHz] | Power[W] | Voltage[V] | $P_{comp}$ [W] |
|---|---|---|---|
| 22 | 3696 | 233 | 3601.4 |
| 21 | 3984 | 239 | 3689.6 |

(2)

Then, the control loop supplies a constant power for 20 [s]. The target power in this particular example has been set to P=2000 [W]:

$$\Delta t=20\ [s]$$

$$\overline{P}_{in}=2000\ [W] \tag{3}$$

After 20 seconds (that is Δt=20 [s]) the second sweep has been performed:

| frequency[kHz] | Power[W] | Voltage[V] | $P_{comp}$ [W] |
|---|---|---|---|
| 50 | 288 | 235 | 275.9 |
| 40 | 384 | 231 | 380.7 |
| 35 | 480 | 230 | 480.0 |
| 30 | 736 | 227 | 755.6 |
| 29 | 832 | 224 | 877.2 |
| 28 | 960 | 225 | 994.3 |
| 27 | 1120 | 221 | 1213.1 |
| 26 | 1360 | 223 | 1446.7 |
| 25 | 1632 | 217 | 1833.4 |
| 24 | 2144 | 219 | 2364.8 |
| 23 | 2768 | 225 | 2892.4 |
| 22 | 3472 | 233 | 3383.2 |
| 21 | 3904 | 239 | 3615.5 |

(4)

At this point the sensitivity curve is evaluated $s(f)=|P_{comp}(0,f)-P_{comp}(\Delta t,f)|$

| frequency [kHz] | $s(f) = \lvert P_{comp}(0, f) - P_{comp}(\Delta t, f)\rvert$ [W] |
|---|---|
| 50 | 17.82 |
| 40 | 35.32 |
| 35 | 52.62 |
| 30 | 65.70 |
| 29 | 110.01 |
| 28 | 109.17 |
| 27 | 133.47 |
| 26 | 153.18 |
| 25 | 198.43 |
| 24 | 253.27 |
| 23 | 234.07 |
| 22 | 218.27 |
| 21 | 74.09 |

(5)

The maximum of sensitivity curve is selected f0=24 [kHz]

$$f_0=24\ [kHz]$$

For this value, we have from the two sweeps the following values:

$$P_{comp}(0,24\ [kHz])=2618.1\ [W]$$

$$P_{comp}(\Delta t,24\ [kHz])=2364.8\ [W] \tag{6}$$

The pot temperature at the end of the Phase 1 is evaluated according to:

$$\Delta T(\Delta t)=\frac{p_3}{p_2}\overline{P}_{in}\cdot(1-e^{-p_2\cdot\Delta t})=\frac{p_3}{p_2}\overline{P}_{in}\cdot(p_2\cdot\Delta t+O(p_2\cdot\Delta t)^2)\approx p_3\overline{P}_{in}\Delta t$$

$$p_2\cdot\Delta t-0.2<<t$$

Then $$\Delta T(\Delta t)\approx p_3\overline{P}_{in}\Delta t=41.32°\ C.$$

Assuming that $T_{pot}(0)=25°$, we have:

$$T_{pot}(0)=66.32°\ C. \tag{7}$$

The parameters $k_1=k_1(24\ [kHz])$, $k_2=k_2(24\ [kHz])$ are evaluated:

$$k_1=P_{comp}(0,24[kHz])\cdot\left(T_{pot}(0)+\frac{P_{comp}(0,24[kHz])\cdot T_{pot}(0)-P_{comp}(\Delta t,24[kHz])\cdot T_{pot}(\Delta t)}{P_{comp}(\Delta t,24[kHz])-P_{comp}(0,24[kHz])}\right)=2618.1\cdot\left(25+\frac{2618.1\cdot25-2364.8\cdot66.32}{2634.8-2618.1}\right)=1.0099e6 \tag{8}$$

$$k_2=\frac{P_{comp}(0,24[kHz])\cdot T_{pot}(0)-P_{comp}(\Delta t,24[kHz])\cdot T_{pot}(\Delta t)}{P_{comp}(\Delta t,24[kHz])-P_{comp}(0,24[kHz])}=\frac{2618.1\cdot25-2364.8\cdot66.32}{2634.8-2618.1}=360.76$$

Equation (VIII) is now known at each value of the time (t>=Δt)

$$T_{pot}(t)=\frac{k_1}{P_{comp}(t,24[kHz])}-k_2 \tag{VIIIb}$$

Figure 7:
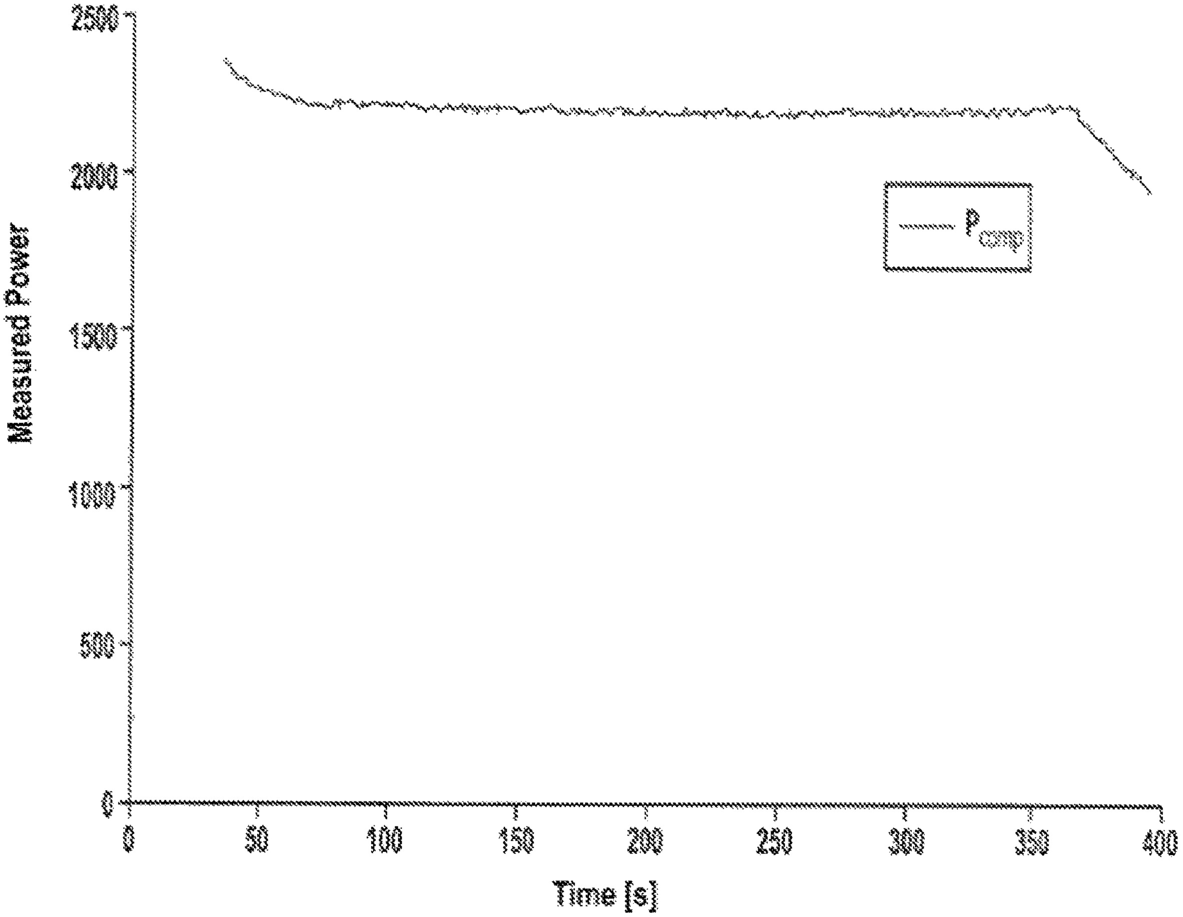
FIG. 7 shows a diagram of measured power vs. time.

In this particular example, during Phase 2 the power must be evaluated at $f_0$=24 [kHz]. But, as explained before, it can be generalized to the case where the switching frequency is variable (see FIG. 7).

Figure 8:
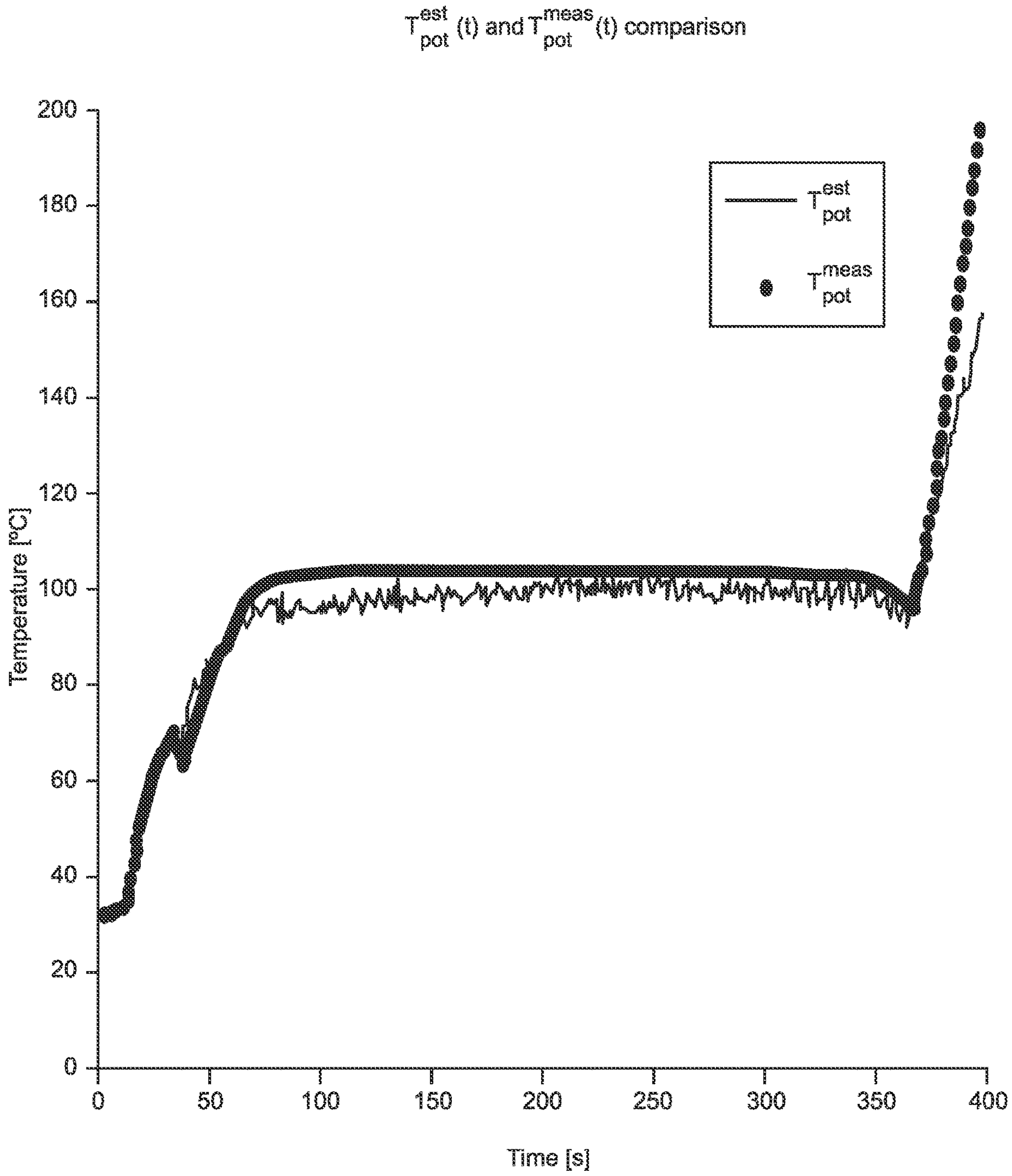
FIG. 8 shows a comparison between the actual (measured) temperature of the pot and the temperature estimated according to the method of the invention, with reference to the shown example.

In FIG. 8. a comparison is made between the estimated and actual pot temperature.

We claim:

1. An induction heating system including an induction coil and a controller having a driving circuit, wherein, during a cooking process for a cooking utensil and contents of the cooking utensil, said controller is configured to:

perform a predetermined number n of electrical measurements of a first electrical parameter of the induction heating system, n being ≥2, to obtain a first set of measurements;

repeat the above set of measurements after a predetermined time interval to obtain a second set of measurements; and estimate at least one thermal parameter of the induction heating system or the contents of the cooking utensil using the first and second sets of measurements, wherein the induction heating system is further configured to employ an algorithm working in an open loop using the at least one thermal parameter to control the cooking process.

2. The induction heating system of claim 1, wherein each measurement of the first electrical parameter is carried out at a predetermined electrical value of a second electrical parameter.

3. The induction heating system of claim 2, wherein the induction heating system is further configured to perform the predetermined number n of electrical measurements or repeat the above set of measurements by:

1) making a first electrical measurement of the first electrical parameter at a first value of the second electrical parameter; and 2) making a second electrical measurement of the first electrical parameter at a second, different value of the second electrical parameter.

4. The induction heating system of claim 2, wherein:

the first electrical parameter is selected from the group consisting of power, current, voltage, power factor, and combinations thereof, and the second electrical parameter is a switch frequency of the induction heating system; or the first electrical parameter is a switch frequency of the induction heating system and the second electrical parameter is selected from the group consisting of power, current, voltage, power factor, and combinations thereof.

5. The induction heating system of claim 2, wherein the second electrical parameter is chosen as function of time in order to have the best estimation of the at least one thermal parameter in terms of sensitivity.

6. The induction heating system of claim 1, wherein the induction heating system is further configured such that the measurements of the first electrical parameter are carried out in a short time during an initial phase wherein the at least one thermal parameter of the induction heating system is substantially constant.

7. The induction heating system of claim 1, wherein the induction heating system is further configured such that no thermal measurements are employed in estimating the at least one thermal parameter.

8. A cooktop for cooking contents of a cooking utensil, said cooktop comprising:

an induction heating system including an induction coil and a controller having a driving circuit, said controller being configured to:

during an initial phase in which the contents stay at a substantially constant temperature, perform a first sweep in which the induction heating system makes a predetermined number n of electrical measurements of a first electrical parameter to obtain a first set of measurements, wherein n is greater than or equal to 2;

during the initial phase, perform a second sweep in which the induction heating system makes a predetermined number m of electrical measurements of the first electrical parameter to obtain a second set of measurements, wherein m is greater than or equal to 2;

calculate at least one parameter using the first and second sets of measurements; and throughout the cooking process, estimate at least one thermal parameter of the induction heating system using the at least one parameter, wherein no thermal measurements are employed in estimating the at least one thermal parameter; and wherein the induction heating system is further configured to control the cooking process by employing an algorithm working in an open loop using the at least one thermal parameter.

9. The cooktop of claim 8, wherein each measurement of the first electrical parameter is made at a predetermined value of a second electrical parameter.

10. The cooktop of claim 9, wherein the induction heating system is further configured to perform the first or second sweep by:

1) making a first electrical measurement of the first electrical parameter at a first value of the second electrical parameter; and 2) making a second electrical measurement of the first electrical parameter at a second, different value of the second electrical parameter.

11. The cooktop of claim 9, wherein:

the first electrical parameter is selected from the group consisting of power, current, voltage, power factor, derivatives thereof and combinations thereof, and the second electrical parameter is a switch frequency of the induction heating system; or the first electrical parameter is a switch frequency of the induction heating system and the second electrical parameter is selected from the group consisting of power, current, voltage, power factor, derivatives thereof and combinations thereof.

12. The cooktop of claim 8, wherein the induction heating system is configured to estimate the at least one thermal parameter of the induction heating system throughout the cooking process without the need to perform additional sweeps.

* * * * *